(12) United States Patent
Zhou et al.

(10) Patent No.: US 10,510,315 B2
(45) Date of Patent: Dec. 17, 2019

(54) DISPLAY PANEL, DRIVING METHOD THEREOF AND DISPLAY DEVICE

(71) Applicant: XIAMEN TIANMA MICRO-ELECTRONICS CO., LTD., Xiamen (CN)

(72) Inventors: Hongbo Zhou, Xiamen (CN); Huangyao Wu, Xiamen (CN); Xiufeng Zhou, Xiamen (CN); Boping Shen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/974,699

(22) Filed: May 9, 2018

(65) Prior Publication Data
US 2018/0261180 A1 Sep. 13, 2018

(30) Foreign Application Priority Data
Jan. 30, 2018 (CN) .......................... 2018 1 0090159

(51) Int. Cl.
*G09G 3/36* (2006.01)
*G02F 1/133* (2006.01)

(52) U.S. Cl.
CPC ....... *G09G 3/3688* (2013.01); *G02F 1/13306* (2013.01); *G09G 3/3614* (2013.01); *G09G 2310/0264* (2013.01)

(58) Field of Classification Search
CPC .......................... G09G 3/3611; G09G 3/3614
See application file for complete search history.

(56) References Cited

U.S. PATENT DOCUMENTS

2013/0002992 A1* 1/2013 Hirata .................. G02F 1/1362
349/85
2014/0313113 A1* 10/2014 Jang ..................... G09G 3/3614
345/87

(Continued)

*Primary Examiner* — Roy P Rabindranath
(74) *Attorney, Agent, or Firm* — Kilpatrick Townsend & Stockton LLP

(57) ABSTRACT

Provided are a display panel, a driving method thereof and a display device, for improving the quality of displayed images and reducing the power consumption. The display panel includes first and second pixel units of opposite polarities, and first and second data lines for transmitting signals of opposite polarities. The first and the second pixel units each includes at least two sub-pixels of different colors. The first data line is connected to the first pixel units in the $(j-1)^{th}$ and $j^{th}$ columns of sub-pixels. Sub-pixels in the first pixel unit in the $(j-1)^{th}$ column have different colors from those in the first pixel unit in the $j^{th}$ column. The second data line is connected to the second pixel units in the $j^{th}$ and $(j+1)^{th}$ columns. Sub-pixels in the second pixel unit in the $j^{th}$ column have different colors from those in the second pixel unit in the $(j+1)^{th}$ column.

11 Claims, 10 Drawing Sheets

(56) References Cited

U.S. PATENT DOCUMENTS

2017/0343867 A1\* 11/2017 Su ..................... G02F 1/134336
2019/0012947 A1\* 1/2019 Cheng ................. G09G 3/2003

\* cited by examiner

DISPLAY PANEL, DRIVING METHOD THEREOF AND DISPLAY DEVICE

CROSS-REFERENCE TO RELATED APPLICATIONS

The present application claims priority to Chinese Patent Application No. 201810090159.5, filed on Jan. 30, 2018, the content of which is incorporated herein by reference in its entirety.

TECHNICAL FIELD

The present disclosure relates to display technology, and more particularly, to a display panel, a driving method thereof, and a display device.

BACKGROUND

At present, in the field of liquid crystal display, in order to prevent the permanent damage caused by the polarization of the liquid crystal material, it is generally needed to perform driving of polarity inversion on the liquid crystal material. The common polarity inversion methods include frame inversion, column inversion, row inversion, and dot inversion. In the case of employing the frame inversion, the row inversion or the column inversion as a polarity inversion manner, each sub-pixel of one color is charged to take one voltage polarity during one frame display, while each sub-pixel of this color is charged to take another voltage polarity during a next frame display. In this way, the flicker phenomenon may easily occur during switching between two frames, thereby affecting the display effect. Although the dot inversion can improve the flicker phenomenon described above, when the dot inversion is currently performed, a data voltage signal loaded on a data line needs frequent polarity inversions, resulting in the large power consumption of the display panel.

SUMMARY

The present application provides a touch display panel, a driving method thereof, and a display device, aiming to improve the picture quality while solving the problem of the large power consumption of the display panel.

In one aspect of the present disclosure, a display panel is provided. The display panel includes N columns of sub-pixels, and each column of the N columns of sub-pixels includes a first pixel unit and a second pixel unit having an opposite polarity to the first pixel unit. The first pixel unit and the second pixel unit each include at least two sub-pixels of different colors. The display panel further includes a plurality of first data lines and a plurality of second data lines. The plurality of first data lines and the plurality of second data lines are sequentially arranged in a row direction, any first data line of the plurality of first data lines and one second data line of the plurality of second data lines that is adjacent to the any first data line are located on two sides of one column of the N columns of sub-pixels, respectively, and are used for transmitting signals having opposite polarities. A first pixel unit in a $(j-1)^{th}$ column of the N columns of sub-pixels is connected to one first data line of the plurality of first data lines and a first pixel unit in a $j^{th}$ column of the N columns of sub-pixels is connected to one first data line of the plurality of first data lines, and sub-pixels included in the first pixel unit in the $(j-1)^{th}$ column have different colors from sub-pixels included in the first pixel unit in the $j^{th}$ column. A second pixel unit in a $j^{th}$ column of the N columns of sub-pixels is connected to one second data line of the plurality of second data lines and a second pixel unit in a $(j+1)^{th}$ column of the N columns of sub-pixels is connected to one second data line of the plurality of second data lines, and sub-pixels included in the second pixel unit in the $j^{th}$ column have different colors from those included in the second pixel unit in the $(j+1)^{th}$ column, and $j=2, 3, \ldots, N$.

In another aspect of the present disclosure, a driving method is provided. The driving method is applied in the above display panel. The driving method includes: providing each of the plurality of first signal lines with a first polarity signal and providing each of the plurality of second signal lines with a second polarity signal during a first time interval of polarity inversion; and providing each of the plurality of first signal lines with the second polarity signal and providing each of the plurality of second signal lines with the first polarity signal during a second time interval of polarity inversion.

In a further aspect of the present disclosure, a display device is provided. The display device includes the above display panel.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure.

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all of the embodiments.

The terms used in the embodiments of the present disclosure are merely for the purpose of describing one embodiment, rather than limiting the present disclosure. The terms "a", "an", "the" and "said" in a singular form in the embodiments of the present disclosure and the attached claims are also intended to include plural forms thereof, unless noted otherwise.

It should be understood that, although the terms 'first' and 'second' may be used in the present disclosure to describe data lines, the data lines should not be limited to these terms. These terms are used only to distinguish the data lines from each other. For example, without departing from the scope of the embodiments of the present disclosure, a first data line may also be referred to as a second data line. Similarly, the second data line may also be referred to as the first data line.

Figure 1:
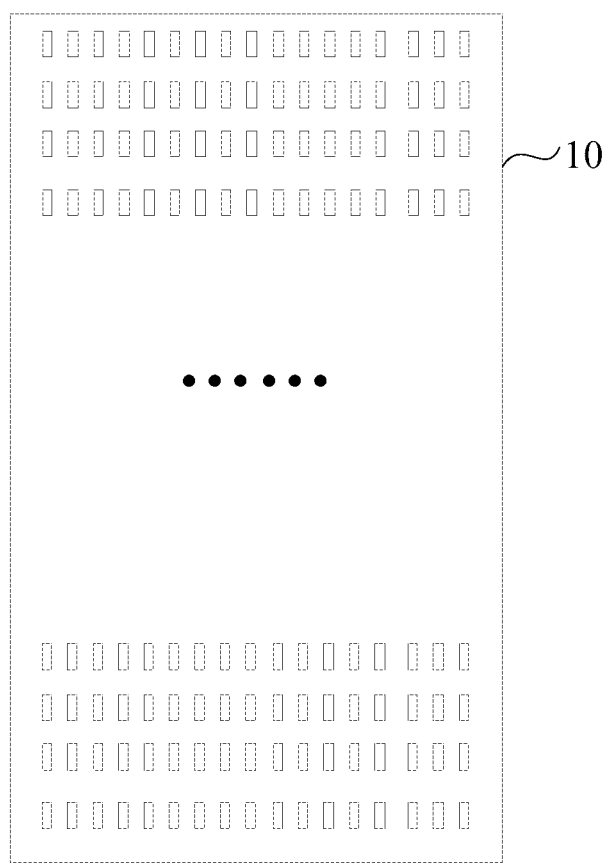
FIG. 1 is a structural schematic diagram of a display panel according to an embodiment of the present disclosure.
Figure 2:
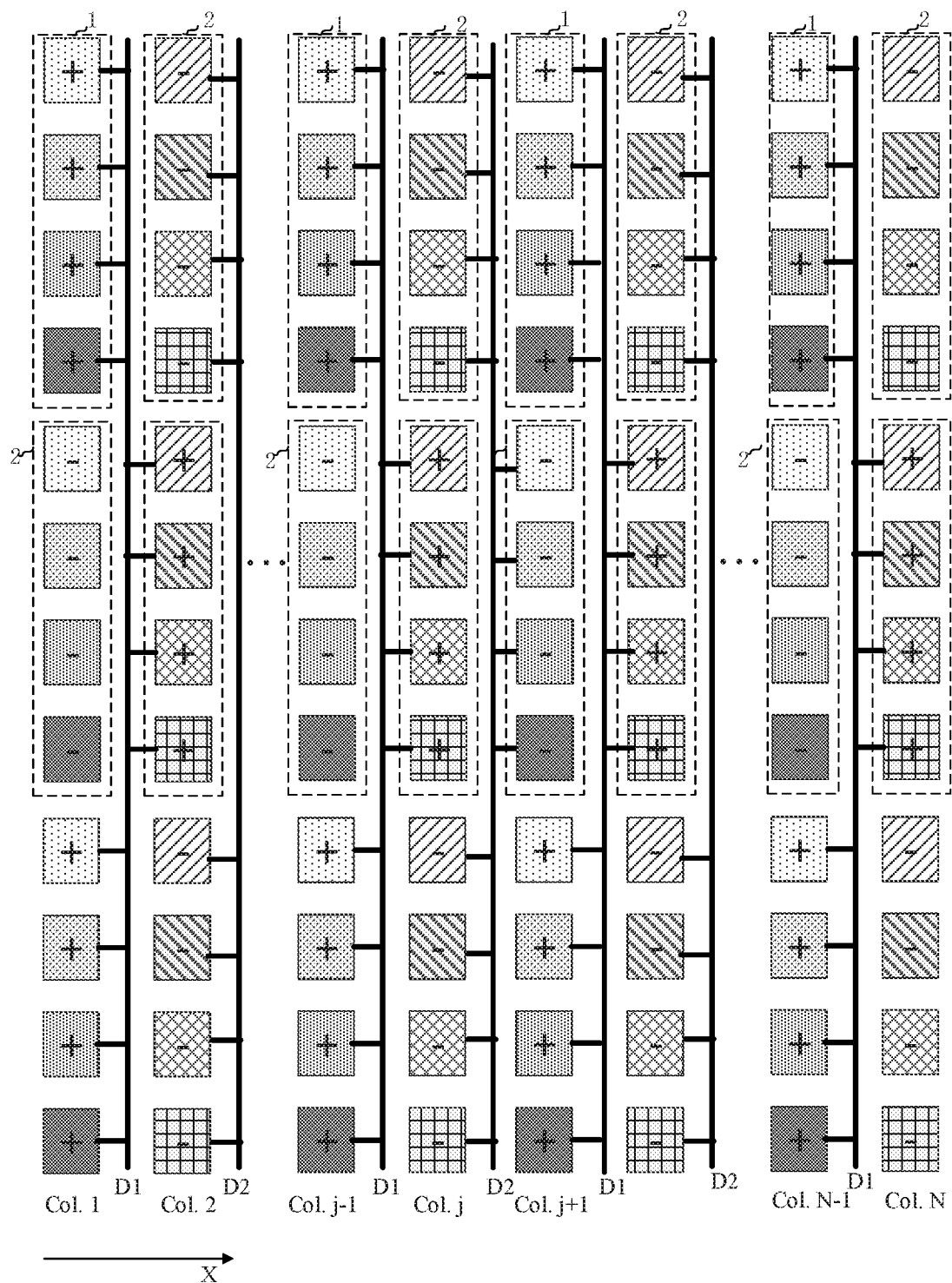
FIG. 2 is a first enlarged view of a display area of the display panel according to the embodiment of the present disclosure.

The embodiments of the present disclosure provide a display panel. FIG. 1 is a schematic diagram showing a display panel according to an embodiment of the present disclosure. FIG. 2 is an enlarged view of a display area of the display panel shown in FIG. 1. The display panel 10 includes N columns of sub-pixels, any of which includes a first pixel unit 1 and a second pixel unit 2 having opposite polarities (FIG. 2 exemplifies the first pixel unit 1 having a positive polarity and the second pixel unit 2 having a negative polarity). The first pixel unit 1 and the second pixel unit 2 each has at least two sub-pixels having different colors (in FIG. 2, sub-pixels illustrated with different fillings patterns represent sub-pixels of different colors). The display panel 10 further includes a plurality of first data lines D1 and a plurality of second data lines D2, both of which are sequentially arranged in a row direction x. Any one data line D1 and one data line D2 that is adjacent to the one data line D1 are located on two sides of one column of sub-pixels, and are used for transmitting signals having opposite polarities. For example, a signal having a positive polarity is transmitted on the data line D1, while a signal having a negative polarity is transmitted on the data line D2, as shown in FIG. 2.

Each data line D1 is connected to first pixel units 1 in a $(j-1)^{th}$ column of sub-pixels and first pixel units 1 in a $j^{th}$ column of sub-pixels, respectively. Sub-pixels included in the first pixel units 1 in the $(j-1)^{th}$ column of sub-pixels have different colors from those included in the first pixel units 1 in the $j^{th}$ column of sub-pixels.

Each data line D2 is connected to second pixel units 2 in the $j^{th}$ column of sub-pixels and second pixel units 2 in a $(j+1)^{th}$ column of sub-pixels, respectively. Sub-pixels included in the second pixel units 2 in the $j^{th}$ column of sub-pixels have different colors from those included in the second pixel units 2 in the $(j+1)^{th}$ column of sub-pixels, and $j=2, 3, \ldots, N$.

Figure 3:
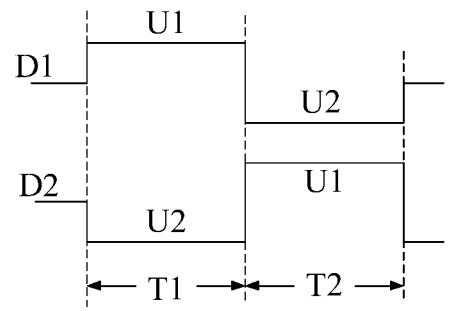
FIG. 3 is a timing sequence of a signal polarity inversion in the display panel according to the embodiment of the present disclosure.

FIG. 3 is a timing sequence diagram of a signal polarity inversion in the display panel according to this embodiment of the present disclosure. When the display panel 10 operates, during a first time interval T1 of polarity inversion, the first data line D1 is provided with a first polarity signal U1 and the second data line D2 is provided with a second polarity signal U2. In this way, a first pixel unit 1 in any column of the N columns of sub-pixels is of a first polarity, and a second pixel unit 2 in any column of the N columns of sub-pixels is of a second polarity. Further, sub-pixels of the same color in the N columns of sub-pixels may not be of the same polarity at the same time. After entering a second time interval T2 of polarity inversion, the first data line D1 is provided with the second polarity signal U2 and the second data line D2 is provided with the first polarity signal U1. In this way, a first pixel unit 1 in any column of the N columns of sub-pixels has its polarity changed from the first polarity to the second polarity, and a second pixel unit 2 in any column of the N columns of sub-pixels has its polarity changed from the second polarity to the first polarity. That is, a part of sub-pixels of the same color in the N columns of sub-pixels can have the polarity changed the first polarity to the second polarity, and another part of sub-pixels of the same color in the N columns of sub-pixels can have the polarity changed from the second polarity to the first polarity. This can avoid the flicker phenomenon that occurs due to all sub-pixels of the same color changing from one polarity to another, and thus improve the display effect.

Moreover, with respect to the driving method employing the dot inversion according to the related art, since two adjacent sub-pixels in any column are of opposite polarities, it is needed to perform one polarity inversion of a data voltage signal that is loaded on any one data line each time when one row of gate line is scanned. According to this embodiment, since the first pixel unit 1 and the second pixel unit 2 each includes at least two sub-pixels of different colors, the use of the display panel according to this embodiment of the present disclosure can allow no need of any inversion of a signal transmitted on a data line at least during the time of scanning two gate lines. Taking a liquid crystal display operating at a frequency of 60 Hz as an example, the time of scanning each frame is 16.7 ms. Assuming that the liquid crystal display has a pixel resolution of 1024×768, the time of scanning each row of gate lines (turn-on time) is 21.7 μs. In the present embodiment, since each pixel unit includes at least two pixels, signals transmitted on the first data line D1 and the second data line D2 require no inversion at least during the time of scanning two rows of gate lines (i.e., at least during the time of 65.1 μs). For a display panel employing the dot inversion driving manner, during the image display, a data voltage signal loaded on a data line needs to be inverted every 21.7 μs. So, the display panel employing the dot inversion driving manner requires the frequent polarity inversion, which significantly increases the power consumption of the display panel. The display panel according to the present embodiment can not only improve the flicker phenomenon, but also reduce the frequency of inversion of a voltage on the data line and thus reduce the power consumption of the display panel.

Figure 4:
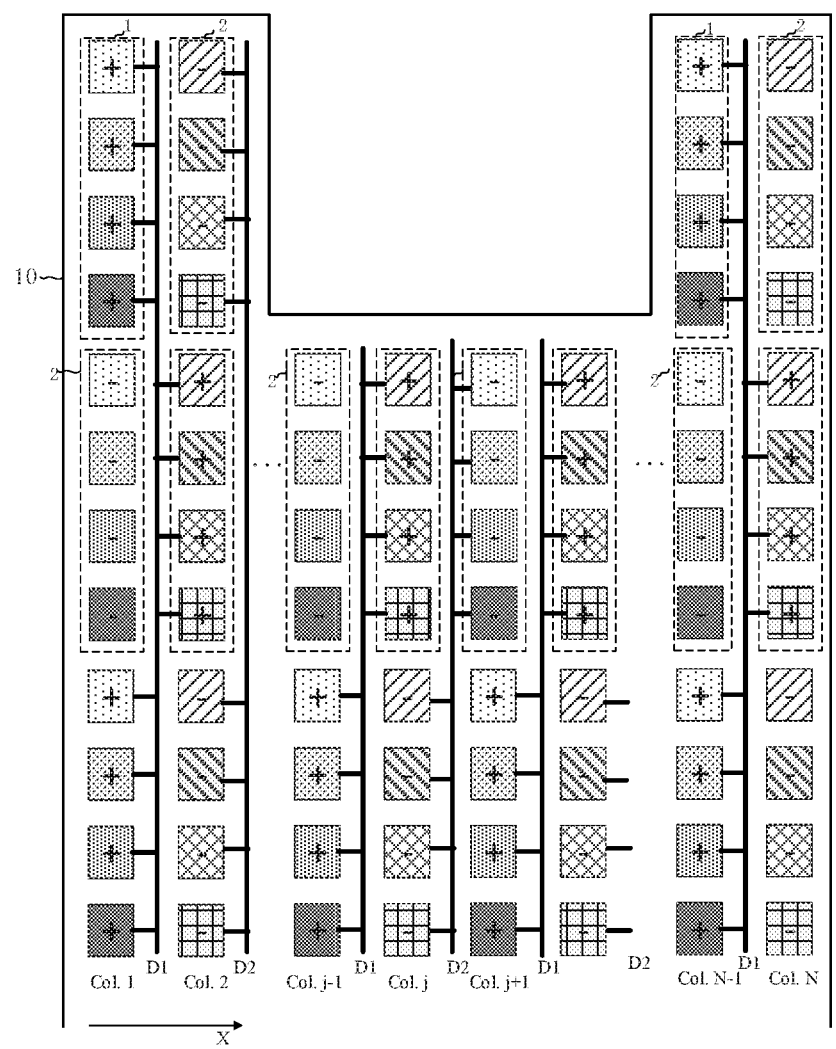
FIG. 4 is an enlarged view of a display area of another display panel according to an embodiment of the present disclosure.

In addition, still referring to FIG. 2, according to the present embodiment, the first data line D1 is connected to a first pixel unit 1 in the $(j-1)^{th}$ column of sub-pixels and a first pixel unit 1 in the $j^{th}$ column of sub-pixels, respectively, and sub-pixels included in the first pixel unit 1 in the $(j-1)^{th}$ column of sub-pixels are set to have different colors from those included in the first pixel unit 1 in the $j^{th}$ column of sub-pixels. The second data line D2 is connected to a second pixel unit 2 in the $j^{th}$ column of sub-pixels and a second pixel unit 2 in the $(j+1)^{th}$ column of sub-pixels, respectively, and sub-pixels included in the second pixel unit 2 in the $j^{th}$ column of sub-pixels are set to have different colors from those included in the second pixel unit 2 in the $(j+1)^{th}$ column of sub-pixels, and j=2, 3, . . . , N. For example, the sub-pixels included in the second pixel unit 2 in the $j^{th}$ column of sub-pixels can be set to have the same colors as those included in the first pixel unit 1 in the $j^{th}$ column of sub-pixels, and the sub-pixels included in the second pixel unit 2 in the $(j+1)^{th}$ column of sub-pixels can be set to have the same colors as those included in the first pixel unit 1 in the $(j-1)^{th}$ column of sub-pixels. In this way, the sub-pixels connected to the first data line D1 and the second data line D2 include sub-pixels of the same colors, and the sub-pixels connected to the first data line D1 and the sub-pixels connected to the second data line D2 can have substantially the same number of sub-pixels of each of the same colors. In one embodiment, as shown in FIG. 2, when the first data line D1 has the same length as the second data line D2, a number of sub-pixels connected to the first data line D1 is the same as a number of sub-pixels connected to the second data line D2, and the sub-pixels connected to the first data line D1 and the sub-pixels connected to the second data line D2 have the same number of sub-pixels of each of the same colors. FIG. 4 is an enlarged view of a display area of another display panel according to the embodiment of the present disclosure. As shown in FIG. 4, the display panel 10 is an abnormal display panel in a shape of non-rectangular, in which the first data lines D1 and the second data lines D2 of different lengths are provided. In the display panel 10, although the number of sub-pixels connected to the first data line D1 is different from the number of sub-pixels connected to the second data line D2, a pixel arrangement as provided in the present embodiment can reduce the difference between the numbers of sub-pixels of the same colors, which are connected to respective data lines, to a smaller range. That is, the present embodiment adjusts arrangements of sub-pixels, connections between the first data line D1 and the sub-pixels and connections between the second data line D2 and the sub-pixels, such that sub-pixels connected to the first data line D1 have the same colors as those connected to the second data line D2, and the sub-pixels connected to the first data line D1 and the sub-pixels connected to the second data line D2 tend to have the same number of sub-pixels of the same colors. This can avoid the problem of different loads on different data lines caused by different sizes of respective sub-pixels, when only sub-pixels of one or more colors are connected to one data line, only sub-pixels of another one or other more different colors are connected to another data line and there is a big difference between the number of sub-pixels of one color connected to one data line and the number of sub-pixels of that color connected to another data line. That is, the present disclosure can allow loads of different data lines to tend to be the same by adjusting arrangements of sub-pixels of different colors and connections between data lines and the sub-pixels, thereby improving the display uniformity of the display panel.

As an example of the present embodiment, two frames can be considered as one polarity inversion period, that is, the first time interval T1 of polarity inversion and the second time interval T2 of polarity inversion are display times of the two successive frames. For example, when displaying the first frame, the first polarity signal U1 is transmitted on the first data line D1, and the second polarity signal U2 is transmitted on the second data line D2. When displaying the second frame, the second polarity signal U2 is transmitted on the first data line D1, and the first polarity signal U1 is transmitted on the second data line D2. Then, the above process is circulated.

It should be noted that the first data line D1 and the second data line D2 are both connected to a drive chip (not shown), which can provide the polarity signals transmitted on the first data line D1 and the second data line D2.

Figure 5:
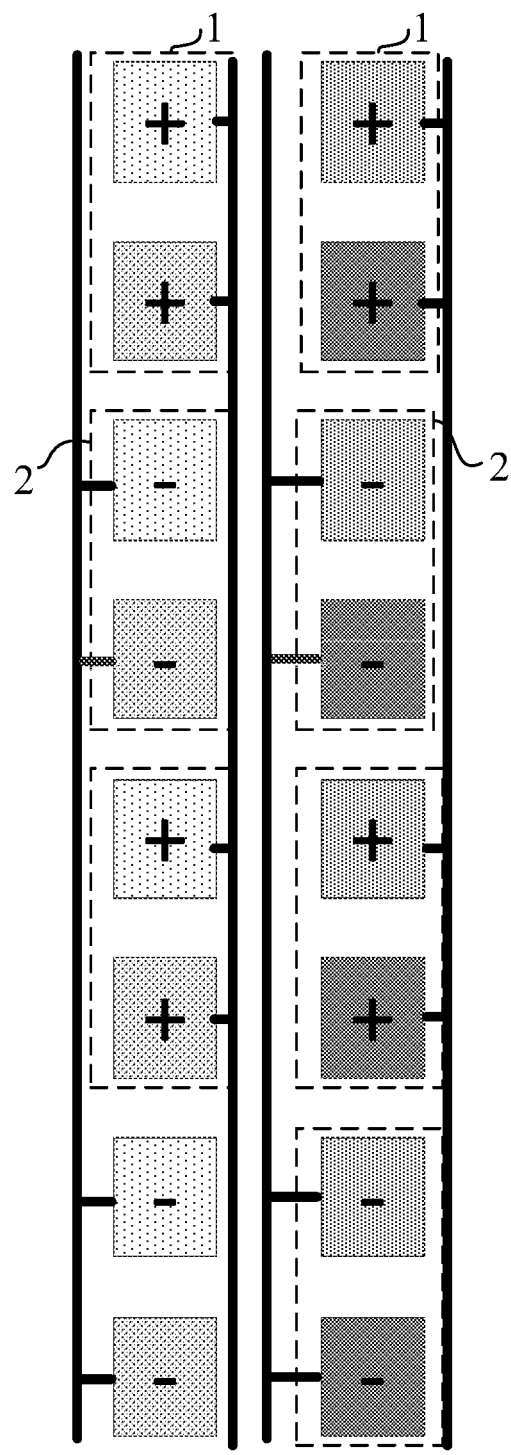
FIG. 5 is a schematic diagram showing a data line connection in which first pixel units in two adjacent columns are located in the same row and second pixel units in two adjacent columns are located in the same row.

Still referring to FIG. 2, the first pixel unit 1 in the $j^{th}$ column of sub-pixels is located in the same row as the second pixel unit 2 in the $(j-1)^{th}$ column of sub-pixels, and the second pixel unit 2 in the $j^{th}$ column of sub-pixels is located in the same row as the first pixel unit 1 in the $(j-1)^{th}$ column of sub-pixels. This can allow the sub-pixels to be regularly arranged in the display panel 10 without adding the additional number of data lines. In particular, if first pixel units 1 in two adjacent columns are located in the same row, second pixel units 2 in the two adjacent columns are also located in the same row. This is because in the actual display process, sub-pixels in each column each has a corresponding data voltage signal, and thus sub-pixels in two adjacent columns need to be charged by using four data lines. In one embodiment, as shown in FIG. 5, there are two data lines for charging the first pixel units 1 and the second pixel units 2 in the first column of sub-pixels, respectively, and there are another two data lines for charging the first pixel units 1 and the second pixel units 2 in the second column of sub-pixels, respectively. However, according to the present embodiment, the first pixel unit 1 in the $j^{th}$ column of sub-pixels is set to be located in the same row as the second pixel unit 2 in the $(j-1)^{th}$ column of sub-pixels, and the second pixel unit 2 in the $j^{th}$ column of sub-pixels is set to be located in the same row as the first pixel unit 1 in the $(j-1)^{th}$ column of sub-pixels, so that the first pixel unit 1 or the second pixel unit 2 in the two adjacent columns can share one data line, as shown in FIG. 2. In this case, sub-pixels in two adjacent columns can be charged by only three data lines. Therefore, the pixel arrangement according to the present embodiment can reduce the number of data lines and increase the area of an aperture.

Figure 6:
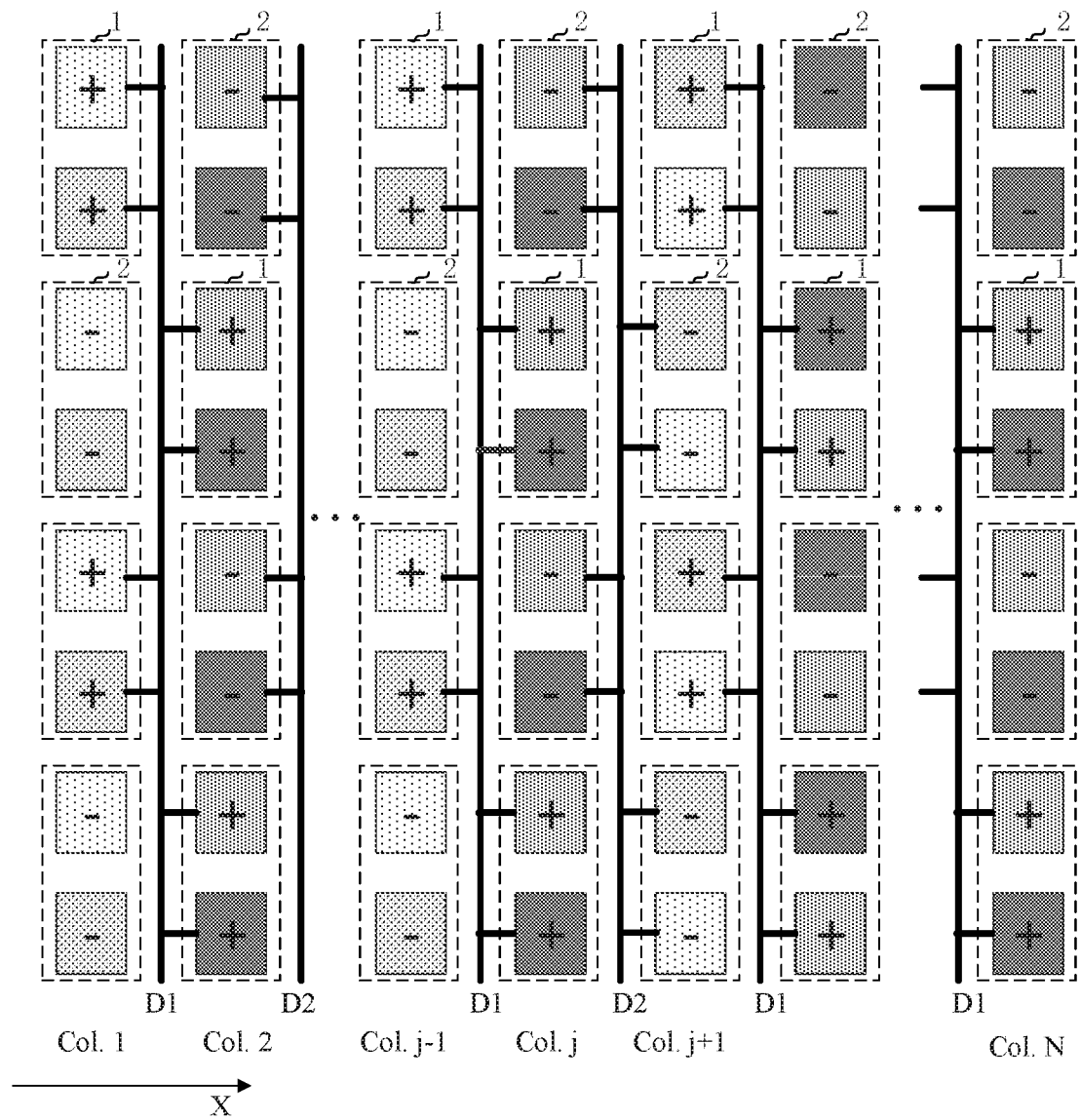
FIG. 6 is a second enlarged view of a display area of a display panel according to an embodiment of the present disclosure.

For example, as shown in FIG. 6, the first pixel unit 1 and the second pixel unit 2 each includes two sub-pixels of different colors. Different filling patterns in the drawing represent different colors. Two sub-pixels included in the first pixel unit 1 in the $(j-1)^{th}$ column of sub-pixels have different colors from two sub-pixels included in the first pixel unit 1 in the $j^{th}$ column of sub-pixels. Two sub-pixels included in the second pixel unit 2 in the $j^{th}$ column of sub-pixels have same colors as the two sub-pixels included in the first pixel unit 1 in the $j^{th}$ column of sub-pixels. Two sub-pixels included in the second pixel unit 2 in the $(j+1)^{th}$ column of sub-pixels have same colors as the two sub-pixels included in the first pixel unit 1 in the $(j-1)^{th}$ column of sub-pixels. According to the present embodiment, the first pixel unit 1 and the second pixel unit 2 each includes two sub-pixels of different colors, so that when performing inversion, an inversion manner similar to the dot inversion is employed by using two sub-pixels as the minimum unit of inversion, thereby improving the flicker phenomenon.

Figure 7:
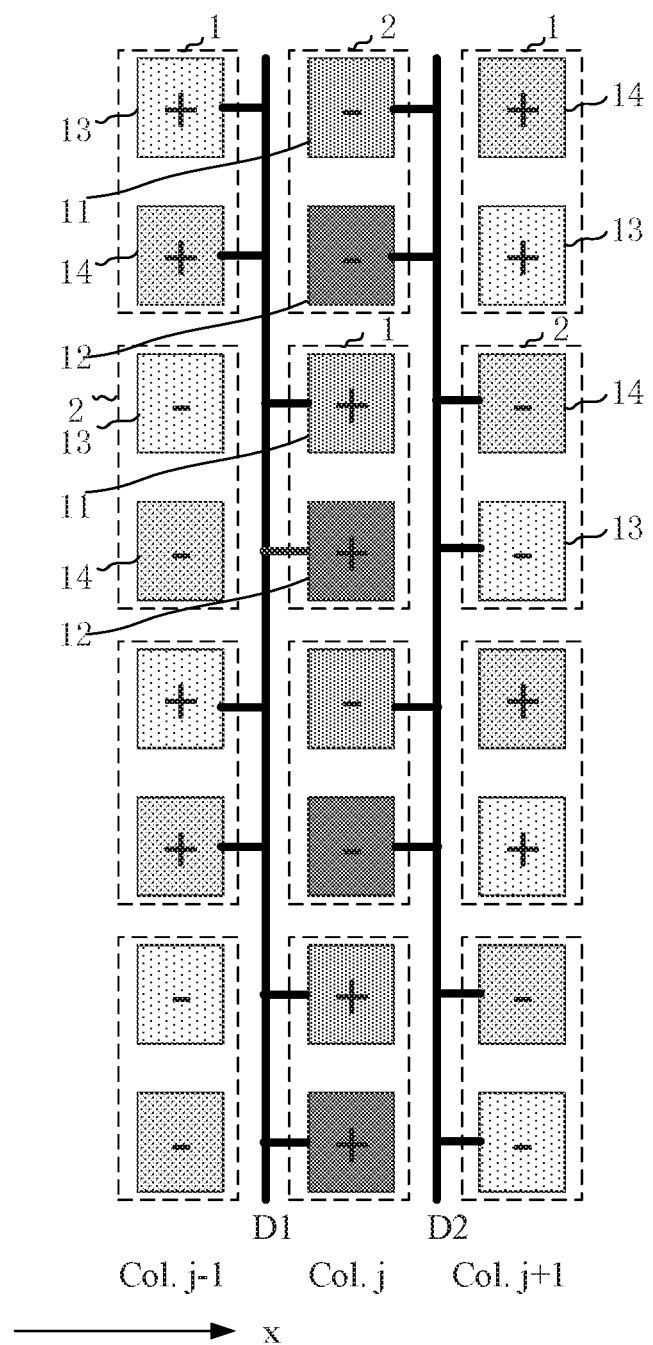
FIG. 7 is a third enlarged view of a display area of a display panel according to an embodiment of the present disclosure.

As an example, FIG. 7 is an enlarged view of three adjacent columns of sub-pixels shown in FIG. 6. The first pixel unit 1 in the $j^{th}$ column of sub-pixels includes a first sub-pixel 11 and a second sub-pixel 12. The first pixel unit 1 in the $(j-1)^{th}$ column of sub-pixels includes a third sub-pixel 13 and a fourth sub-pixel 14. The second pixel unit 2 in the $j^{th}$ column of sub-pixels includes a first sub-pixel 11 and a second sub-pixel 12. The second pixel unit 2 in the $(j+1)^{th}$ column of sub-pixels includes a third sub-pixel 13 and a fourth sub-pixel 14. In one embodiment, the first sub-pixel 11 is a red sub-pixel R, the second sub-pixel 12 is a green sub-pixel G, the third sub-pixel 13 is a blue sub-pixel B, and the fourth sub-pixel 14 is a highlighted sub-pixel. According to the present embodiment, the use of the highlighted sub-pixels can increase the light transmittance of the display panel, thereby reducing the power consumption of the display panel while displaying an image with the same brightness. In one embodiment, the highlighted sub-pixel can be a white sub-pixel W or a yellow sub-pixel Y.

As shown in FIGS. 6 and 7, when the first sub-pixel 11 is the red sub-pixel R, the second sub-pixel 12 is the green sub-pixel G, the third sub-pixel 13 is the blue sub-pixel B and the fourth sub-pixel 14 is the white sub-pixel W, respective sub-pixels connected to the first data line D1 are sequentially arranged in an order of BWRG and respective sub-pixels connected to the second data line D2 are sequentially arranged in an order of RGWB. For example, as shown in FIG. 3, when the display panel operates during the first time interval T1 of polarity inversion, the first data line D1 is provided with a first polarity signal U1 and the second data line D2 is provided with a second polarity signal U2. In this case, with respect to sub-pixels of any color in the N columns of sub-pixels, taking the red sub-pixels as an example, a part of red sub-pixels R has a first polarity, the other part of red sub-pixels R has the second polarity. Then, when the display panel operates during the second time interval T2 of polarity inversion, the first data line D1 is provided with the second polarity signal U2 and the second data line D2 is provided with the first polarity signal U1. In this case, still taking the red sub-pixels as an example, a part of red sub-pixels R has the polarity changed from the first polarity to the second polarity and the other part of red sub-pixels R has the polarity changed from the second polarity to the first polarity, thereby avoiding the flicker phenomenon that occurs due to all sub-pixels of the same color changing from one polarity to another and thus improving the display effect. Further, according to the present embodiment, since respective sub-pixels connected to the first data line D1 are sequentially arranged in the order of BWRG and respective sub-pixels connected to the second data line D2 are sequentially arranged in the order of RGWB, this can ensure that the sub-pixels connected to the first data line D1 and the sub-pixels connected to the second data line D2 contain sub-pixels of the same colors, and that the sub-pixels connected to the first data line D1 and the sub-pixels connected to the second data line D2 have basically the same number of sub-pixels of each of the same colors. This can avoid the problem of different loads on different data lines caused by different sizes of respective sub-pixels, when only sub-pixels of one or more colors are connected to one data line, only sub-pixels of another one or more different colors are connected to another data line and there is a big difference between the number of sub-pixels of one color connected to one data line and the number of sub-pixels of that color connected to another data line. That is, the present disclosure can allow loads of different data lines to tend to be the same by adjusting arrangements of sub-pixels of different colors and connections between data lines and the sub-pixels, thereby improving the display uniformity of the display panel.

It should be noted that the size of the sub-pixel in the drawing is merely exemplary. Actually, when the first sub-pixel 11 is a red sub-pixel, the second sub-pixel 12 is a green sub-pixel, the third sub-pixel 13 is a blue sub-pixel and the fourth sub-pixel 14 is a highlighted sub-pixel, at least two sub-pixels among the first sub-pixel 11, the second sub-pixel 12, the third sub-pixel 13 and the fourth sub-pixel 14 have different sizes. Exemplarily, the above-mentioned highlight sub-pixel can be set smaller, so that when solid-color images of different colors are displayed, brightness of the solid-color images of various colors can tend to be consistent.

Figure 8:
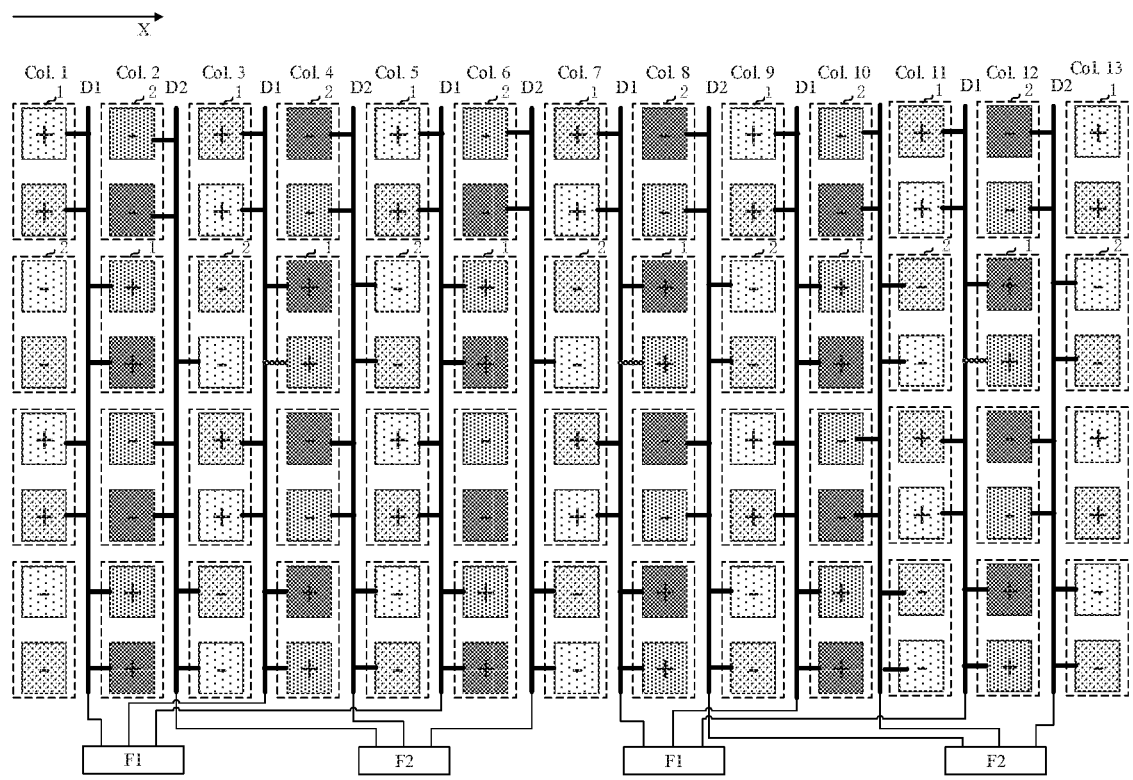
FIG. 8 is a fourth enlarged view of a display area of a display panel according to an embodiment of the present disclosure.

FIG. 8 is another schematic diagram of the display panel according to the embodiment of the present disclosure. As shown in FIG. 8, the plurality of first data lines D1 includes a plurality of sets of first data lines, and the plurality of second data lines D2 includes a plurality of sets of second data lines. The display panel further includes a plurality of first multiplexed units F1 corresponding to the plurality of sets of first data lines in one-to-one correspondence and a plurality of second multiplexed units F2 corresponding to the plurality of sets of second data lines in one-to-one correspondence. The plurality of first multiplexed units F1 and the plurality of second multiplexed units F2 output signals have opposite polarities. According to the present embodiment, the plurality of first multiplexed units F1 and the plurality of second multiplexed units F2 are provided, each first multiplexed unit F1 is connected to one set of first data lines, each second multiplexed unit F2 is connected to one set of second data lines, and the first multiplexed units F1 and the second multiplexed units F2 are connected to a drive chip (not shown). The drive chip can be used to provide, through one signal line (not shown), the first multiplexed unit F1 with a first polarity signal, which is provided to a number of first data lines D1. In addition, the drive chip can be used to provide, through another signal line (not shown), the second multiplexed unit F2 with a second polarity signal, which is provided to a number of second data lines D2. This arrangement can prevent each data line D1 and each data line D2 from being directly connected to the drive chip, thereby reducing the number of ports on the drive chip.

Figure 9:
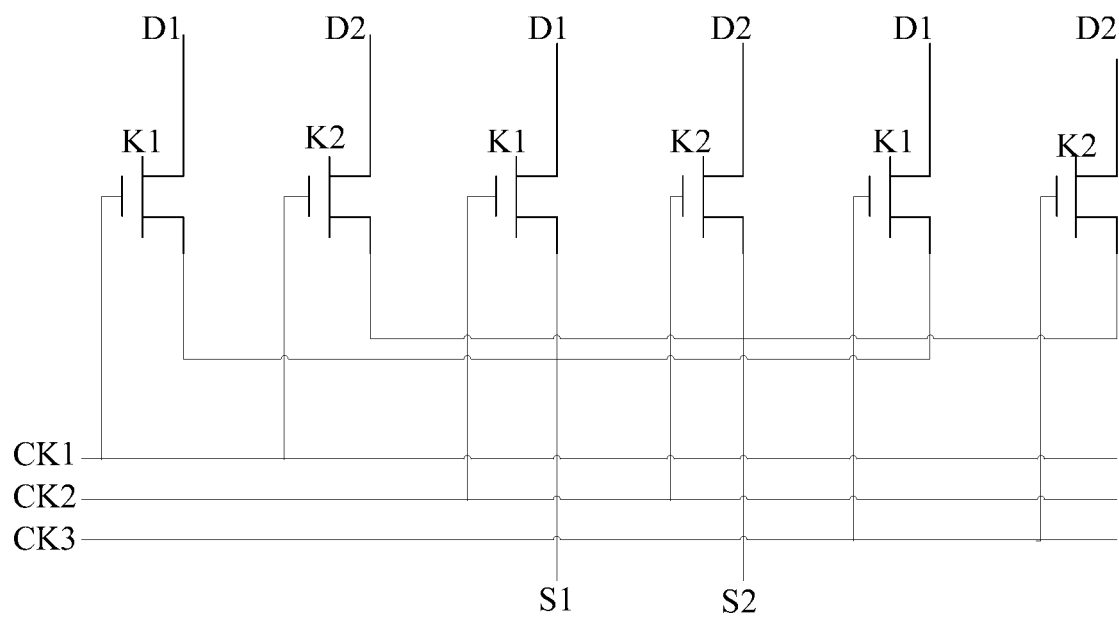
FIG. 9 is a first diagram showing an equivalent circuit of FIG. 8.
Figure 10:
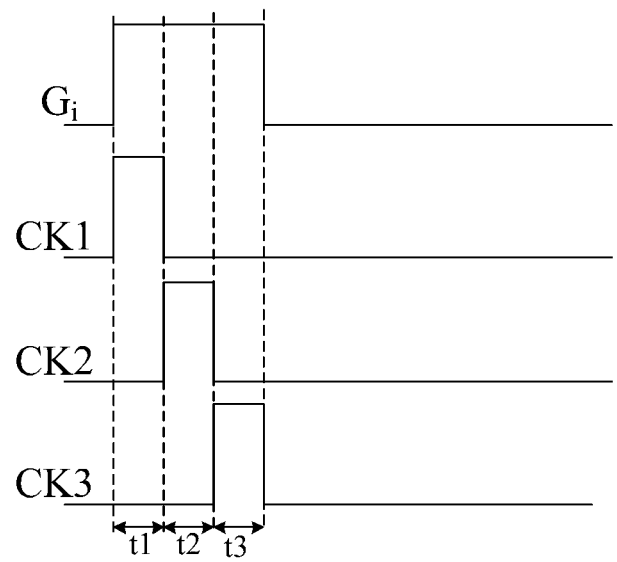
FIG. 10 is a signal timing sequence corresponding to FIG. 9.

The above technology utilizing one signal line to provide a signal to a number of data lines can be referred to as a demux technology. FIG. 9 is a schematic diagram of a circuit of a first multiplexed unit and a second multiplexed unit according to the present embodiment. As shown in FIG. 9, each set of first data lines includes p first data lines D1, each set of second data lines includes p second data lines D2, the first multiplexed unit includes p first switch elements K1, the second multiplexed unit includes p second switch elements K2, and the display panel further includes p switch control signal lines CK1-CKp, and p is an integer greater than or equal to 1 and smaller or equal to N/2. FIG. 9 takes p=3 as an example, in which control terminals of three first switch elements K1 and control terminals of three second switch elements K2 are connected to three switch control signal lines CK1-CK3 in one-to-one correspondence. First terminals of the first switch elements K1 are connected to the first data lines D1 in each set of first data lines in one-to-one correspondence. Second terminals of the first switch elements K1 are connected to a first polarity signal terminal S1. First terminals of the second switch elements K2 are connected to the second data lines D2 in each set of second data lines in one-to-one correspondence. Second terminals of the second switch elements K2 are connected to a second polarity signal terminal S2. In the following, a driving method of the display panel will be particularly explained in conjunction with FIGS. 3 and 10. FIG. 10 is a signal timing sequence corresponding to FIG. 9.

When the display panel operates, it can take two frames as one polarity inversion period. For example, when the display panel operates during a first time interval T1 of polarity inversion, the first polarity signal terminal S1 outputs a first polarity signal, and the second polarity signal terminal S2 outputs a second polarity signal, in a period of turning-on time of any one gate line $G_i$:

in a first time interval t1, under a control signal output from the switch control signal line CK1, a first one of the first switch elements K1 and a first one of the second switch elements K2 connected to the switch control signal line CK1 are turned on, so that the first polarity signal output from the first polarity signal terminal S1 is transmitted to a first one of the first data lines D1 and the second polarity signal output from the second polarity signal terminal S2 is transmitted to a first one of the second data lines D2; that is, the first polarity signal is filled into sub-pixels connected to the above gate line $G_i$ and the first one of the first data lines D1, and the second polarity signal is filled into sub-pixels connected to the above gate line $G_i$ and the first one of the second data lines D2;

in a second time interval t2, under a control signal output from the switch control signal line CK2, a second one of the first switch elements K1 and a second one of the second switch elements K2 connected to the switch control signal line CK2 are turned on, so that the first polarity signal output from the first polarity signal terminal S1 is transmitted to a second one of the first data lines D1 and the second polarity signal output from the second polarity signal terminal S2 is transmitted to a second one of the second data lines D2; that is, the first polarity signal is filled into sub-pixels connected to the above gate line $G_i$ and the second one of the first data lines D1, and the second polarity signal is filled into sub-pixels connected to the above gate line $G_i$ and the second one of the second data lines D2;

in a third time interval t3, under a control signal output from the switch control signal line CK3, a third one of the first switch elements K1 and a third one of the second switch elements K2 connected to the switch control signal line CK3 are turned on, so that the first polarity signal output from the first polarity signal terminal S1 is transmitted to a third one of the first data lines D1 and the second polarity signal output from the second polarity signal terminal S2 is transmitted to a third one of the second data lines D2; that is, the first polarity signal is filled into sub-pixels connected to the above gate line $G_i$, and the third one of the first data lines D1, and the second polarity signal is filled into sub-pixels connected to the above gate line $G_i$, and the third one of the second data lines D2.

Thereafter, a gate line $G_{i+1}$ in the next row is scanned, and CK1, CK2 and CK3 sequentially output control signals, until the display of this frame is completed. Then, in a second time interval T2 of polarity inversion, the first polarity signal terminal S outputs the second polarity signal and the second polarity signal terminal S2 outputs the first polarity signal. Then, the process proceeds with scanning from the first gate line to the last gate line. In the period of turning-on each gate line, the process will proceed following the above timing sequence.

As an example, the first switch elements K1 and the second switch elements K2 can include a PMOS transistor or a NMOS transistor. When the PMOS transistor is used, the switch control signal lines CK1-CK3 output low level signals for controlling the first switch elements K1 and the second switch elements K2 to be turned on. When the NMOS transistor is used, the switch control signal lines CK1-CK3 output high level signals for controlling the first switch elements K1 and the second switch elements K2 to be turned on.

It should be understood that the timing sequence of the above switch control signal lines CK1-CK3 outputting control signals is not limited to the sequence of CK1, CK2 and CK3, but can follow a sequence of CK1, CK3 and CK2 or a sequence of CK3, CK2 and CK1 or any other sequence. In addition, the present disclosure is not limited to the first switch control signal line CK1 connecting to the first one of the first switch elements K1 and the first one of the second switch elements K2. For example, the first switch control signal line CK1 can be also connected to the second one of the first switch elements K1 and the third one of the second switch elements K2. This similarly applies to connections of other switch control signal lines, as long as the control terminals of the p first switch elements K1 are not connected to the same switch control signal line and the control terminals of the p second switch elements K2 are not connected to the same switch control signal line.

Figure 11:
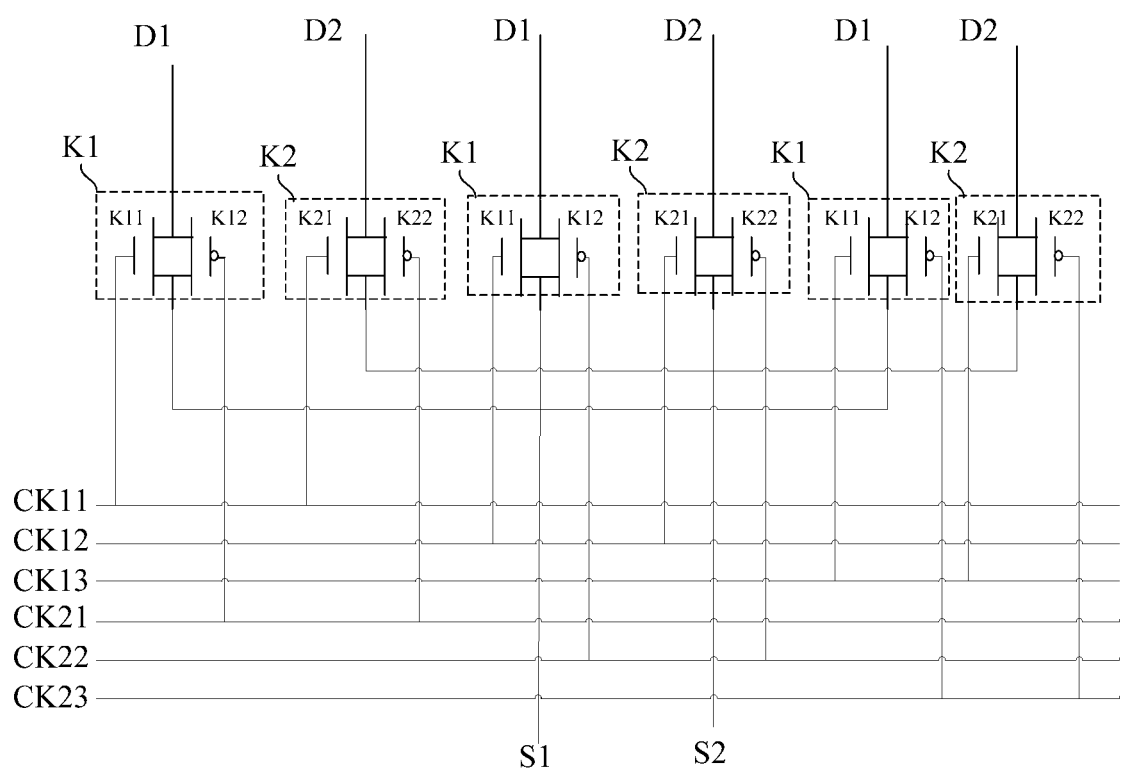
FIG. 11 is a second diagram showing an equivalent circuit of FIG. 8.

For example, as shown in FIG. 11, the first switch element K1 includes a first switch K11 and a second switch K12, the second switch element K2 includes a first switch K21 and a second switch K22, and the switch control signal lines include first switch control signal lines CK11-CK12 and second switch control signal lines CK21-CK23. A control terminal of the first switch K11 of the first switch element and a control terminal of the first switch K21 of the second switch element are connected to one of the first switch control signal lines CK11-CK13. A control terminal of the second switch K12 of the first switch element and a control terminal of the second switch K22 of the second switch element are connected to one of the second switch control signal lines CK21-CK23.

A first terminal of the first switch K11 of the first switch element K1 and a first terminal of the second switch K12 of the first switch element K1 are connected to the first data line D of each set of first data lines in one-to-one correspondence, and a second terminal of the first switch K11 of the first switch element K1 and a second terminal of the second switch K12 of the first switch element K1 are connected to the first polarity signal terminal S1.

A first terminal of the first switch K21 of the second switch element K2 and a first terminal of the second switch K22 of the second switch element K2 are connected to the second data line D2 of each set of second data lines in one-to-one correspondence, and a second terminal of the first switch K21 of the second switch element K2 and a second terminal of the second switch K22 of the second switch element K2 are connected to the second polarity signal terminal S2.

Figure 12:
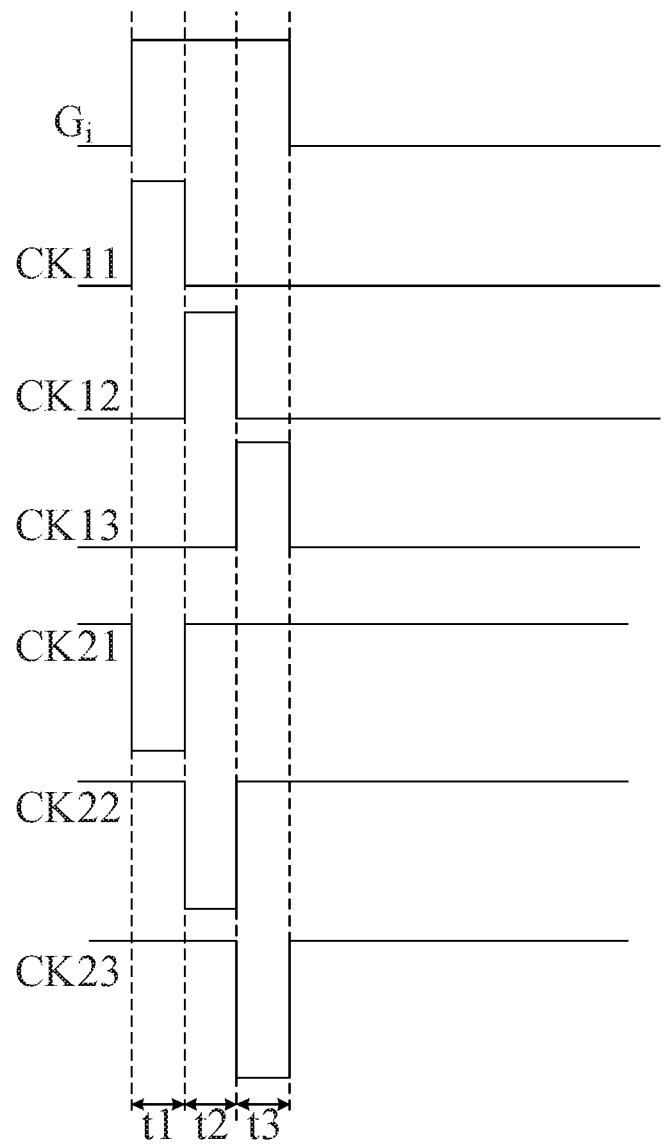
FIG. 12 is a signal timing sequence corresponding to FIG. 11.

In the following, a driving method of the display panel will be particularly explained in conjunction with FIGS. 3 and 12. FIG. 12 is a signal timing sequence corresponding to FIG. 11.

When the display panel operates, it can still take two frames as one polarity inversion period. For example, when the display panel operates during a first time interval T1 of polarity inversion, the first polarity signal terminal S1 outputs a first polarity signal, and the second polarity signal terminal S2 outputs a second polarity signal, in a period of turning-on any one gate line $G_i$:

in a first time interval t1, under control signals output from a first one of the first switch control signal lines CK11 and a first one of the second switch control signal lines CK21, a first switch K11 and a second switch K12 of a first one of the first switch elements K1 connected to the first one of the first switch control signal lines CK11 and the first one of the second switch control signal lines CK21 are turned on, and a first switch K21 and a second switch K22 of a first one of the second switch elements K2 connected to the first one of the first switch control signal lines CK11 and the first one of the second switch control signal lines CK21 are turned on, so that the first polarity signal output from the first polarity signal terminal S1 is transmitted to a first one of the first data lines D1 and the second polarity signal output from the second polarity signal terminal S2 is transmitted to a first one of the second data lines D2; that is, the first polarity signal is filled into sub-pixels connected to the above gate line $G_i$ and the first one of the first data lines D1, and the second polarity signal is filled into sub-pixels connected to the above gate line $G_i$ and the first one of the second data lines D2;

in a second time interval t2, under control signals output from a second one of the first switch control signal lines CK12 and a second one of the second switch control signal lines CK22, a first switch K11 and a second switch K12 of a second one of the first switch elements K1 connected to the second one of the first switch control signal lines CK12 and the second one of the second switch control signal lines CK22 are turned on, and a first switch K21 and a second switch K22 of a second one of the second switch elements K2 connected to the second one of the first switch control signal lines CK12 and the second one of the second switch control signal lines CK22 are turned on, so that the first polarity signal output from the first polarity signal terminal S1 is transmitted to a second one of the first data lines D1 and the second polarity signal output from the second polarity signal terminal S2 is transmitted to a second one of the second data lines D2; that is, the first polarity signal is filled into sub-pixels connected to the above gate line $G_i$ and the second one of the first data lines D1, and the second polarity signal is filled into sub-pixels connected to the above gate line $G_i$ and the second one of the second data lines D2;

in a third time interval t3, under control signals output from a third one of the first switch control signal lines CK13 and a third one of the second switch control signal lines CK23, a first switch K11 and a second switch K12 of a third one of the first switch elements K1 connected to the third one of the first switch control signal lines CK13 and the third one of the second switch control signal lines CK23 are turned on, and a first switch K21 and a second switch K22 of a third one of the second switch elements K2 connected to the third one of the first switch control signal lines CK13 and the third one of the second switch control signal lines CK23 are turned on, so that the first polarity signal output from the first polarity signal terminal S1 is transmitted to a third one of the first data lines D1 and the second polarity signal output from the second polarity signal terminal S2 is transmitted to a third one of the second data lines D2; that is, the first polarity signal is filled into sub-pixels connected to the above gate line $G_i$ and the third one of the first data lines D1, and the second polarity signal is filled into sub-pixels connected to the above gate line $G_i$ and the third one of the second data lines D2.

Thereafter, a gate line $G_{i+1}$ in the next row is scanned, and CK11-CK13 and CK21-CK23 sequentially output control signals, until the display of this frame is completed. Then, in a second time interval T2 of polarity inversion, the first polarity signal terminal S1 outputs the second polarity signal and the second polarity signal terminal S2 outputs the first polarity signal. Then, the process proceeds with scanning from the first gate line to the last gate line. In the period of turning-on each gate line, the process will proceed following the above timing sequence.

As an example, the first switch is a PMOS transistor and the second switch is a NMOS transistor. In the present embodiment, the first switching element K1 and the second switching element K2 can be respectively formed by using a PMOS transistor and an NMOS transistor, so as to overcome a case in which there is a threshold loss for the PMOS transistor when transmitting a low level while no threshold loss when transmitting a high level; or in which there is a threshold loss for the NMOS transistor when transmitting a high level while no threshold loss when transmitting a low level. In this embodiment, the first switching element K1 and the second switching element K2 are respectively formed by using a PMOS transistor and a NMOS transistor, so as to achieve the effect of no threshold loss when transmitting high and low levels. In one embodiment, the first switching element K1 and the second switching element K2 in this embodiment can use a CMOS transistor.

It should be understood that the timing sequence of the above first switch control signal lines CK11-CK13 outputting control signals is not limited to the sequence of CK11, CK12 and CK13, but can follow a sequence of CK11, CK13 and CK12 or a sequence of CK13, CK12 and CK11 or any other sequence; and similarly, the timing sequence of the above second switch control signal lines CK21-CK23 outputting control signals is not limited to the sequence of CK21, CK22 and CK23, but can follow a sequence of CK21, CK23 and CK22 or a sequence of CK23, CK22 and CK21 or any other sequence, as long as switch control signal lines connecting to the same first switch and second switch can output a control signal at the same time. In addition, the present disclosure is not limited to the first one of the first switch control signal lines CK11 connecting with the first switch K11 of the first one of the first switch elements K1 and the first switch K21 of the first one of the second switch elements K2, and is not limited to the first one of the second switch control signal lines CK21 connecting with the first switch K11 of the first one of the first switch elements K1 and the first switch K21 of the first one of the second switch elements K2. For example, the first one of the first switch control signal lines CK11 can be also connected to the first switch K11 of the second one of the first switch elements K1 and the first switch K21 of the third one of the second switch elements K2, and the first one of the second switch control signal lines CK21 can be also connected to the first switch K11 of the second one of the first switch elements K1 and the first switch K21 of the third one of the second switch elements K2. This similarly applies to connections of other switch control signal lines, as long as the control terminals of the first switches of the p first switch elements K1 are not connected to the same first switch control signal line, the control terminals of the second switches of the p first switch elements K1 are not connected to the same second switch control signal line, the control terminals of the first switches of the p second switch elements K2 are not connected to the same first switch control signal line, and the control terminals of the second switches of the p second switch elements K2 are not connected to the same second switch control signal line.

Figure 13:
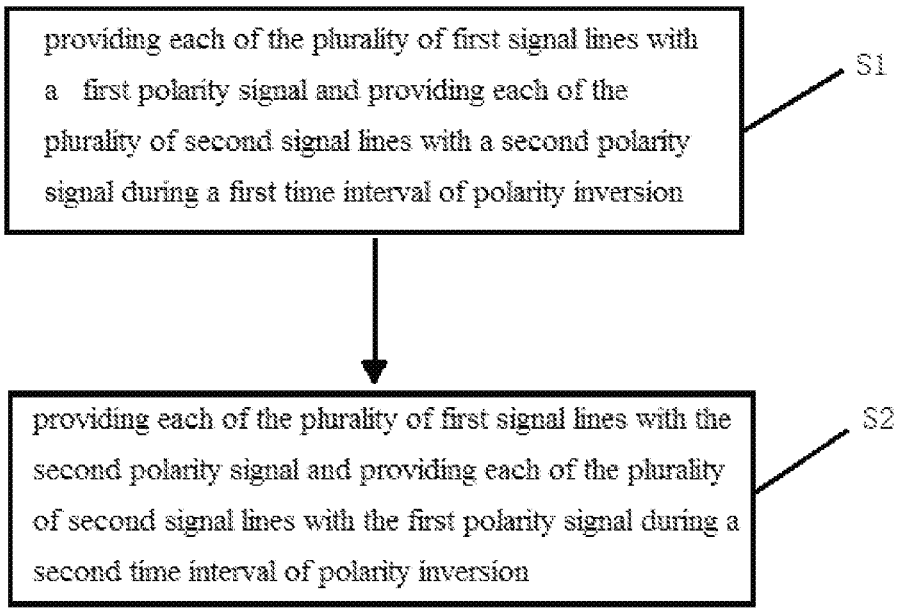
FIG. 13 is a flowchart showing a driving method according to an embodiment of the present disclosure.

The present disclosure further provides a driving method. The driving method can be applied in the above display panel. As shown in FIG. 3 and FIG. 13, which is a flowchart showing the driving method, the driving method includes:

S1: providing the first signal lines D1 with a first polarity signal and providing the second signal lines D2 with a second polarity signal during a first time interval T1 of polarity inversion; and S2: providing the first signal lines D1 with the second polarity signal and providing the second signal lines D2 with the first polarity signal during a second time interval T2 of polarity inversion.

When using the driving method according to the present disclosure, during the operation of the display panel, the first data lines D1 can be provided with the first polarity signal and the second data lines D2 can be provided with the second polarity signal during the first time interval T1 of polarity inversion, and the first data lines D1 can be provided with the second polarity signal and the second data lines D2 can be provided with the first polarity signal during the second time interval T2 of polarity inversion. Since the first data line D1 is used to provide the first polarity signal to the first pixel unit 1, the second data line D2 is used to provide the second polarity signal to the second pixel unit 2, and the first pixel unit and the second pixel unit each includes at least two sub-pixels of different colors, the at least two sub-pixels of different colors being connected to at least two gate lines, when scanning at least two rows of gate lines connected to the first pixel unit or the second pixel unit, no inversion is required for data voltage signals transmitted on the first data line and the second data line. As compared with the existing polarity inversion manner adopting the dot inversion, in which the data voltage signals should be inverted each time when one row of gate line is scanned, the technical solution according to the embodiments of the present disclosure can reduce the frequency of performing polarity inversion of the data voltage signals transmitted on the first data line and the second data line, thereby further reducing the power consumption of the display panel. Further, in the display panel according to the embodiments of the present disclosure, the first data line is connected to the first pixel unit in the $(j-1)^{th}$ column of sub-pixels and the first pixel unit in the $j^{th}$ column of sub-pixels, respectively, sub-pixels included in the first pixel unit in the $(j-1)^{th}$ column of sub-pixels have different colors from those included in the first pixel unit in the $j^{th}$ column of sub-pixel; the second data line is connected to the second pixel unit in the $j^{th}$ column of sub-pixels and the second pixel unit in the $(j+1)^{th}$ column of sub-pixels, respectively, and sub-pixels included in the second pixel unit in the $j^{th}$ column of sub-pixels have different colors from those included in the second pixel unit in the $(j+1)^{th}$ column of sub-pixels. That is, in the display panel according to the embodiments of the present disclosure, colors of sub-pixels connected to the first data line are the same as those connected to the second data line. This can avoid the problem of different loads on different data lines caused by different sizes of respective sub-pixels when only sub-pixels of one or more colors are connected to one data line, only sub-pixels of another one or more different colors are connected to another data line. That is, the present disclosure can allow loads of different data lines to tend to be the same by adjusting arrangements of sub-pixels of different colors and connections between data lines and the sub-pixels, thereby improving the display uniformity of the display panel.

As an example, the first polarity can be opposite to the second polarity, so that sub-pixels can operate in opposite polarities, thereby preventing polarization of the liquid crystal material constituting the sub-pixels.

In addition, the detailed implementations of the driving method of the display panel have been explained in detail in the above embodiments, and thus will not be described herein.

Figure 14:
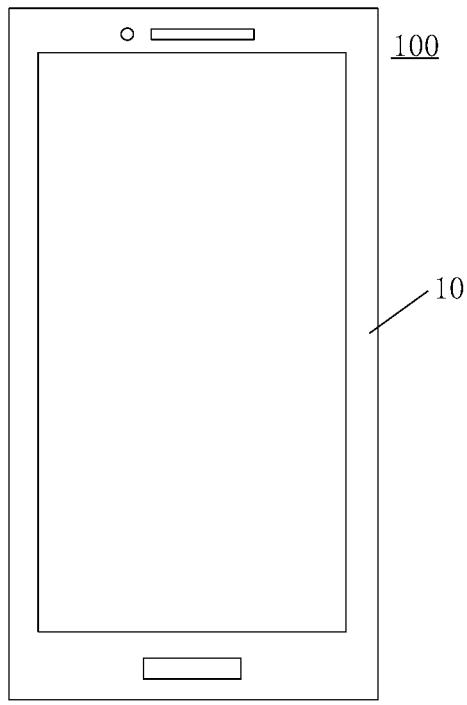
FIG. 14 is a structural schematic diagram of a display device according to an embodiment of the present disclosure.

The present disclosure further provides a display device as shown in FIG. 14. FIG. 14 is a structural schematic diagram of a display device according to an embodiment of the present disclosure. The display device 100 includes the display panel 10 as mentioned above. The specific structure and driving method of the display panel 10 have been explained in detail in the above embodiments, and thus will not be described herein. Of course, the display device of FIG. 14 is merely for illustration, and it can be any electronic device with display function, such as a mobile phone, a tablet computer, a laptop, an e-book or a television.

Since the display device 100 provided in the embodiments of the present disclosure includes the display panel 10 as described above, the display device can not only improve the quality of displayed images, but also solve the problem of the large power consumption of the display panel.

What is claimed is:

1. A display panel, comprising:
    N columns of sub-pixels, wherein each column of the N columns of sub-pixels comprises a first pixel unit and a second pixel unit having an opposite polarity to the first pixel unit, the first pixel unit and the second pixel unit each comprising at least two sub-pixels of different colors,
    a plurality of first data lines, and
    a plurality of second data lines;
    wherein the plurality of first data lines and the plurality of second data lines are sequentially arranged in a row direction, any first data line of the plurality of first data lines and one second data line of the plurality of second data lines that is adjacent to the any first data line are located on two sides of one column of the N columns of sub-pixels, respectively, and are used for transmitting signals having opposite polarities,
    a first pixel unit in a $(j-1)^{th}$ column of the N columns of sub-pixels is connected to one first data line of the plurality of first data lines and a first pixel unit in a $j^{th}$ column of the N columns of sub-pixels is connected to one first data line of the plurality of first data lines, and sub-pixels comprised in the first pixel unit in the $(j-1)^{th}$ column have different colors from sub-pixels comprised in the first pixel unit in the $j^{th}$ column,
    a second pixel unit in a $j^{th}$ column of the N columns of sub-pixels is connected to one second data line of the plurality of second data lines and a second pixel unit in a $(j+1)^{th}$ column of the N columns of sub-pixels is connected to one second data line of the plurality of second data lines, and sub-pixels comprised in the second pixel unit in the $j^{th}$ column have different colors from those comprised in the second pixel unit in the $(j+1)^{th}$ column, wherein $j=2, 3, \ldots, N$,
    the plurality of first data lines comprises a plurality of sets of first data lines, and the plurality of second data lines comprises a plurality of sets of second data lines, and
    the display panel further comprises a plurality of first multiplexed units corresponding to the plurality of sets of first data lines in one-to-one correspondence and a plurality of second multiplexed units corresponding to the plurality of sets of second data lines in one-to-one correspondence, and the plurality of first multiplexed units output signals having opposite polarities to signals output from the plurality of second multiplexed units,
    each set of the plurality of sets of first data lines comprises p first data lines, each set of the plurality of sets of second data lines comprises p second data lines, each of the plurality of first multiplexed units comprises p first switch elements, each of the plurality of second multiplexed units comprises p second switch elements, and the display panel further comprises p switch control signal lines,
    wherein control terminals of the p first switch elements in each first multiplexed unit are connected to the p switch control signal lines in one-to-one correspondence and control terminals of the p second switch elements in each second multiplexed unit are connected to the p switch control signal lines in one-to-one correspondence, wherein first terminals of the p first switch elements in each first multiplexed unit are connected to the p first data lines in each set of the plurality sets of first data lines in one-to-one correspondence, and second terminals of the p first switch elements in each first multiplexed unit are connected to a first polarity signal terminal, wherein first terminals of the p second switch elements in each second multiplexed unit are connected to the p second data lines in each set of the plurality sets of second data lines in one-to-one correspondence, and second terminals of the p second switch elements in each second multiplexed unit are connected to a second polarity signal terminal, where p is an integer greater than or equal to 1 and smaller or equal to N/2, each of the first switch elements comprises a first switch and a second switch, each of the second switch elements comprises a first switch and a second switch, and the switch control signal lines comprise first switch control signal lines and second switch control signal lines, wherein a control terminal of the first switch of each of the first switch elements and a control terminal of the first switch of each of the second switch elements are connected to one of the first switch control signal lines, and a control terminal of the second switch of each of the first switch elements and a control terminal of the second switch of each of the second switch elements are connected to one of the second switch control signal lines, wherein a first terminal of the first switch of each of the first switch elements and a first terminal of the second switch of each of the first switch elements are connected to one first data line of each set of the plurality of sets of first data lines in one-to-one correspondence, and a second terminal of the first switch of each of the first switch elements and a second terminal of the second switch of each of the first switch elements are connected to the first polarity signal terminal, and wherein a first terminal of the first switch of each of the second switch elements and a first terminal of the second switch of each of the second switch elements are connected to one second data line of each set of the plurality of sets of second data lines in one-to-one correspondence, and a second terminal of the first switch of each of the second switch elements and a second terminal of the second switch of each of the second switch elements are connected to the second polarity signal terminal.

2. The display panel according to claim 1, wherein the first pixel unit in the $j^{th}$ column is located in a same row as a second pixel unit in the $(j-1)^{th}$ column, and the second pixel unit in the $j^{th}$ column is located in the same row as the first pixel unit in the $(j-1)^{th}$ column.

3. The display panel according to claim 1, wherein the first pixel unit of each of the N columns of sub-pixels comprises two sub-pixels of different colors, and the second pixel unit of each of the N columns of sub-pixels comprises two sub-pixels of different colors, two sub-pixels comprised in the first pixel unit in the $(j-1)^{th}$ column have different colors from two sub-pixels comprised in the first pixel unit in the $j^{th}$ column of sub-pixels, two sub-pixels comprised in the second pixel unit in the $j^{th}$ column have same colors as the two sub-pixels comprised in the first pixel unit in the $j^{th}$ column, and two sub-pixels comprised in the second pixel unit in the $(j+1)^{th}$ column have same colors as the two sub-pixels comprised in the first pixel unit in the $(j-1)^{th}$ column of sub-pixels.

4. The display panel according to claim 3, wherein the first pixel unit in the $j^{th}$ column comprises a first sub-pixel and a second sub-pixel, and the first pixel unit in the $(j-1)^{th}$ column comprises a third sub-pixel and a fourth sub-pixel, and the second pixel unit in the $j^{th}$ column comprises a first sub-pixel and a second sub-pixel, and the second pixel unit in the $(j+1)^{th}$ column comprises a third sub-pixel and a fourth sub-pixel.

5. The display panel according to claim 4, wherein the first sub-pixel is a red sub-pixel, the second sub-pixel is a green sub-pixel, the third sub-pixel is a blue sub-pixel, and the fourth sub-pixel is a highlighted sub-pixel.

6. The display panel according to claim 5, wherein the highlighted sub-pixel is a white sub-pixel or a yellow sub-pixel.

7. The display panel according to claim 5, wherein among the first sub-pixel, the second sub-pixel, the third sub-pixel and the fourth sub-pixel, there are at least two sub-pixels of different sizes.

8. The display panel according to claim 1, wherein the first switch is a PMOS transistor, and the second switch is a NMOS transistor.

9. A driving method applied in a display panel, the display panel comprising:

N columns of sub-pixels, wherein each column of the N columns of sub-pixels comprises a first pixel unit and a second pixel unit having an opposite polarity to the first pixel unit, the first pixel unit and the second pixel unit each comprising at least two sub-pixels of different colors, a plurality of first data lines, and a plurality of second data lines;

wherein the plurality of first data lines and the plurality of second data lines are sequentially arranged in a row direction, any first data line of the plurality of first data lines and one second data line of the plurality of second data lines that is adjacent to the any first data line are located on two sides of one column of the N columns of sub-pixels, respectively, and are used for transmitting signals having opposite polarities, a first pixel unit in a $(j-1)^{th}$ column of the N columns of sub-pixels is connected to one first data line of the plurality of first data lines and a first pixel unit in a $j^{th}$ column of the N columns of sub-pixels is connected to one first data line of the plurality of first data lines, and sub-pixels comprised in the first pixel unit in the $(j-1)^{th}$ column have different colors from sub-pixels comprised in the first pixel unit in the $j^{th}$ column, a second pixel unit in a $j^{th}$ column of the N columns of sub-pixels is connected to one second data line of the plurality of second data lines and a second pixel unit in a $(j+1)^{th}$ column of the N columns of sub-pixels is connected to one second data line of the plurality of second data lines, and sub-pixels comprised in the second pixel unit in the $j^{th}$ column have different colors from those comprised in the second pixel unit in the $(j+1)^{th}$ column, wherein j=2, 3, . . . , N, the plurality of first data lines comprises a plurality of sets of first data lines, and the plurality of second data lines comprises a plurality of sets of second data lines, and the display panel further comprises a plurality of first multiplexed units corresponding to the plurality of sets of first data lines in one-to-one correspondence and a plurality of second multiplexed units corresponding to the plurality of sets of second data lines in one-to-one correspondence, and the plurality of first multiplexed units output signals having opposite polarities to signals output from the plurality of second multiplexed units, each set of the plurality of sets of first data lines comprises p first data lines, each set of the plurality of sets of second data lines comprises p second data lines, each of the plurality of first multiplexed units comprises p first switch elements, each of the plurality of second multiplexed units comprises p second switch elements, and the display panel further comprises p switch control signal lines, wherein control terminals of the p first switch elements in each first multiplexed unit are connected to the p switch control signal lines in one-to-one correspondence and control terminals of the p second switch elements in each second multiplexed unit are connected to the p switch control signal lines in one-to-one correspondence, wherein first terminals of the p first switch elements in each first multiplexed unit are connected to the p first data lines in each set of the plurality sets of first data lines in one-to-one correspondence, and second terminals of the p first switch elements in each first multiplexed unit are connected to a first polarity signal terminal, wherein first terminals of the p second switch elements in each second multiplexed unit are connected to the p second data lines in each set of the plurality sets of second data lines in one-to-one correspondence, and second terminals of the p second switch elements in each second multiplexed unit are connected to a second polarity signal terminal, where p is an integer greater than or equal to 1 and smaller or equal to N/2, each of the first switch elements comprises a first switch and a second switch, each of the second switch elements comprises a first switch and a second switch, and the switch control signal lines comprise first switch control signal lines and second switch control signal lines, wherein a control terminal of the first switch of each of the first switch elements and a control terminal of the first switch of each of the second switch elements are connected to one of the first switch control signal lines, and a control terminal of the second switch of each of the first switch elements and a control terminal of the second switch of each of the second switch elements are connected to one of the second switch control signal lines, wherein a first terminal of the first switch of each of the first switch elements and a first terminal of the second switch of each of the first switch elements are connected to one first data line of each set of the plurality of sets of first data lines in one-to-one correspondence, and a second terminal of the first switch of each of the first switch elements and a second terminal of the second switch of each of the first switch elements are connected to the first polarity signal terminal, and wherein a first terminal of the first switch of each of the second switch elements and a first terminal of the second switch of each of the second switch elements are connected to one second data line of each set of the plurality of sets of second data lines in one-to-one correspondence, and a second terminal of the first switch of each of the second switch elements and a second terminal of the second switch of each of the second switch elements are connected to the second polarity signal terminal, wherein the driving method comprises:

providing each of the plurality of first signal lines with a first polarity signal and providing each of the plurality of second signal lines with a second polarity signal during a first time interval of polarity inversion; and providing each of the plurality of first signal lines with the second polarity signal and providing each of the plurality of second signal lines with the first polarity signal during a second time interval of polarity inversion.

10. The driving method according to claim 9, wherein the first polarity signal is of a polarity opposite to that of the second polarity signal.

11. A display device, comprising a display panel, the display panel comprising:

N columns of sub-pixels, wherein each column of the N columns of sub-pixels comprises a first pixel unit and a second pixel unit having an opposite polarity to the first pixel unit, the first pixel unit and the second pixel unit each comprising at least two sub-pixels of different colors, a plurality of first data lines, and a plurality of second data lines;

wherein the plurality of first data lines and the plurality of second data lines are sequentially arranged in a row direction, any first data line of the plurality of first data lines and one second data line of the plurality of second data lines that is adjacent to the any first data line are located on two sides of one column of the N columns of sub-pixels, respectively, and are used for transmitting signals having opposite polarities, a first pixel unit in a $(j-1)^{th}$ column of the N columns of sub-pixels is connected to one first data line of the plurality of first data lines and a first pixel unit in a $j^{th}$ column of the N columns of sub-pixels is connected to one first data line of the plurality of first data lines, and sub-pixels comprised in the first pixel unit in the $(j-1)^{th}$ column have different colors from sub-pixels comprised in the first pixel unit in the $j^{th}$ column, a second pixel unit in a $j^{th}$ column of the N columns of sub-pixels is connected to one second data line of the plurality of second data lines and a second pixel unit in a $(j+1)^{th}$ column of the N columns of sub-pixels is connected to one second data line of the plurality of second data lines, and sub-pixels comprised in the second pixel unit in the $j^{th}$ column have different colors from those comprised in the second pixel unit in the $(j+1)^{th}$ column, wherein j=2, 3, . . . , N, the plurality of first data lines comprises a plurality of sets of first data lines, and the plurality of second data lines comprises a plurality of sets of second data lines, and the display panel further comprises a plurality of first multiplexed units corresponding to the plurality of sets of first data lines in one-to-one correspondence and a plurality of second multiplexed units corresponding to the plurality of sets of second data lines in one-to-one correspondence, and the plurality of first multiplexed units output signals having opposite polarities to signals output from the plurality of second multiplexed units, each set of the plurality of sets of first data lines comprises p first data lines, each set of the plurality of sets of second data lines comprises p second data lines, each of the plurality of first multiplexed units comprises p first switch elements, each of the plurality of second multiplexed units comprises p second switch elements, and the display panel further comprises p switch control signal lines, wherein control terminals of the p first switch elements in each first multiplexed unit are connected to the p switch control signal lines in one-to-one correspondence and control terminals of the p second switch elements in each second multiplexed unit are connected to the p switch control signal lines in one-to-one correspondence, wherein first terminals of the p first switch elements in each first multiplexed unit are connected to the p first data lines in each set of the plurality sets of first data lines in one-to-one correspondence, and second terminals of the p first switch elements in each first multiplexed unit are connected to a first polarity signal terminal, wherein first terminals of the p second switch elements in each second multiplexed unit are connected to the p second data lines in each set of the plurality sets of second data lines in one-to-one correspondence, and second terminals of the p second switch elements in each second multiplexed unit are connected to a second polarity signal terminal, where p is an integer greater than or equal to 1 and smaller or equal to N/2, each of the first switch elements comprises a first switch and a second switch, each of the second switch elements comprises a first switch and a second switch, and the switch control signal lines comprise first switch control signal lines and second switch control signal lines, wherein a control terminal of the first switch of each of the first switch elements and a control terminal of the first switch of each of the second switch elements are connected to one of the first switch control signal lines, and a control terminal of the second switch of each of the first switch elements and a control terminal of the second switch of each of the second switch elements are connected to one of the second switch control signal lines, wherein a first terminal of the first switch of each of the first switch elements and a first terminal of the second switch of each of the first switch elements are connected to one first data line of each set of the plurality of sets of first data lines in one-to-one correspondence, and a second terminal of the first switch of each of the first switch elements and a second terminal of the second switch of each of the first switch elements are connected to the first polarity signal terminal, and wherein a first terminal of the first switch of each of the second switch elements and a first terminal of the second switch of each of the second switch elements are connected to one second data line of each set of the plurality of sets of second data lines in one-to-one correspondence, and a second terminal of the first switch of each of the second switch elements and a second terminal of the second switch of each of the second switch elements are connected to the second polarity signal terminal.

\* \* \* \* \*